(12) United States Patent
Bansod

(10) Patent No.: US 8,719,767 B2
(45) Date of Patent: May 6, 2014

(54) UTILIZING SNAPSHOTS TO PROVIDE BUILDS TO DEVELOPER COMPUTING DEVICES

(75) Inventor: Ketan Bansod, South Amboy, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 351 days.

(21) Appl. No.: 13/076,765

(22) Filed: Mar. 31, 2011

(65) Prior Publication Data

US 2012/0254824 A1    Oct. 4, 2012

(51) Int. Cl.
*G06F 9/44* (2006.01)
*G06F 9/455* (2006.01)

(52) U.S. Cl.
USPC .............................. 717/101; 717/120; 718/1

(58) Field of Classification Search
None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Software Builds and the Virtual Time Machine, Dr. Dobb's, Jan. 23, 2008.*

(Continued)

*Primary Examiner* — Insun Kang
(74) *Attorney, Agent, or Firm* — Perkins Coie LLP

(57) ABSTRACT

A method and system for utilizing snapshots to provide software builds to developer computing devices is described. In some examples, the system, in response to receiving a request for a software build, performs a snapshot of a storage volume containing the requested build, and mounts the snapshot to the developer computing device, enabling the developer computing device to access the software build. In some examples, the system, in response to receiving a request for a software build, establishes a virtual machine, performs a snapshot of a storage volume containing the requested build, mounts the snapshot to the established virtual machine, and provides the virtual machine to the requesting computing device.

16 Claims, 5 Drawing Sheets

(56) References Cited

U.S. PATENT DOCUMENTS

| | | |
|---|---|---|
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,904 B1 | 2/2002 | Bartmann et al. |
| RE37,601 E | 3/2002 | Eastridge et al. |
| 6,356,801 B1 | 3/2002 | Goodman et al. |
| 6,366,986 B1 | 4/2002 | St. Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,959,310 B2 | 10/2005 | Eshel et al. |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |
| 7,346,623 B2 | 3/2008 | Prahlad et al. |
| 7,383,538 B2 | 6/2008 | Bates et al. |
| 7,386,532 B2 | 6/2008 | Kiessig et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,480,779 B2 | 1/2009 | Tsuji |
| 7,509,316 B2 | 3/2009 | Greenblatt et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,567,991 B2 | 7/2009 | Armangau et al. |
| 7,568,080 B2 * | 7/2009 | Prahlad et al. ................ 711/162 |
| 7,580,950 B2 | 8/2009 | Kavuri et al. |
| 7,596,611 B1 | 9/2009 | Satish et al. |
| 7,620,666 B1 | 11/2009 | Root et al. |
| 7,651,593 B2 | 1/2010 | Prahlad et al. |
| 7,668,884 B2 | 2/2010 | Prahlad et al. |
| 7,707,184 B1 | 4/2010 | Zhang et al. |
| 7,716,171 B2 | 5/2010 | Kryger |
| 7,716,183 B2 | 5/2010 | Lee |
| 7,725,440 B2 | 5/2010 | Reed et al. |
| 7,734,578 B2 | 6/2010 | Prahlad et al. |
| 7,761,456 B1 | 7/2010 | Cram et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,873,806 B2 * | 1/2011 | Prahlad et al. ................ 711/162 |
| 7,882,077 B2 | 2/2011 | Gokhale et al. |
| 7,933,927 B2 | 4/2011 | Dee et al. |
| 7,979,389 B2 | 7/2011 | Prahlad et al. |
| 8,055,625 B2 | 11/2011 | Prahlad et al. |
| 2002/0107877 A1 | 8/2002 | Whiting et al. |

(56) References Cited

U.S. PATENT DOCUMENTS

| | | | |
|---|---|---|---|
| 2003/0028514 A1 | 2/2003 | Lord et al. | |
| 2003/0033346 A1 | 2/2003 | Carlson et al. | |
| 2003/0167380 A1 | 9/2003 | Green et al. | |
| 2003/0177149 A1 | 9/2003 | Coombs | |
| 2004/0139125 A1 | 7/2004 | Strassburg et al. | |
| 2004/0170374 A1 | 9/2004 | Bender et al. | |
| 2004/0230566 A1 | 11/2004 | Balijepalli et al. | |
| 2004/0260678 A1 | 12/2004 | Verbowski et al. | |
| 2005/0132346 A1* | 6/2005 | Tsantilis | 717/168 |
| 2005/0203864 A1 | 9/2005 | Schmidt et al. | |
| 2005/0216912 A1* | 9/2005 | Cox et al. | 717/178 |
| 2006/0224846 A1 | 10/2006 | Amarendran et al. | |
| 2006/0277542 A1* | 12/2006 | Wipfel | 717/174 |
| 2007/0185940 A1 | 8/2007 | Prahlad et al. | |
| 2008/0028009 A1 | 1/2008 | Ngo | |
| 2008/0228771 A1 | 9/2008 | Prahlad et al. | |
| 2008/0229037 A1 | 9/2008 | Bunte et al. | |
| 2008/0243953 A1 | 10/2008 | Wu et al. | |
| 2008/0294605 A1 | 11/2008 | Prahlad et al. | |
| 2009/0182963 A1 | 7/2009 | Prahlad et al. | |
| 2009/0300604 A1* | 12/2009 | Barringer | 717/178 |
| 2009/0300641 A1* | 12/2009 | Friedman et al. | 718/104 |
| 2009/0319534 A1 | 12/2009 | Gokhale | |
| 2009/0319585 A1 | 12/2009 | Gokhale | |
| 2010/0070474 A1 | 3/2010 | Lad | |
| 2010/0070725 A1 | 3/2010 | Prahlad et al. | |
| 2010/0070726 A1* | 3/2010 | Ngo et al. | 711/162 |
| 2010/0082672 A1 | 4/2010 | Kottomtharayil et al. | |
| 2010/0250549 A1 | 9/2010 | Muller et al. | |
| 2010/0293144 A1* | 11/2010 | Bonnet | 707/640 |
| 2010/0299490 A1 | 11/2010 | Attarde et al. | |
| 2010/0312754 A1 | 12/2010 | Bear et al. | |
| 2010/0313185 A1* | 12/2010 | Gupta et al. | 717/124 |
| 2011/0131187 A1 | 6/2011 | Prahlad et al. | |
| 2011/0161295 A1 | 6/2011 | Ngo | |
| 2011/0161299 A1 | 6/2011 | Prahlad et al. | |
| 2011/0264620 A1 | 10/2011 | Prahlad et al. | |
| 2012/0179886 A1 | 7/2012 | Prahlad et al. | |

FOREIGN PATENT DOCUMENTS

| | | | |
|---|---|---|---|
| EP | 0467546 | A2 | 1/1992 |
| EP | 0774715 | A1 | 5/1997 |
| EP | 0809184 | A1 | 11/1997 |
| EP | 0838758 | | 4/1998 |
| EP | 0899662 | A1 | 3/1999 |
| EP | 0981090 | A1 | 2/2000 |
| EP | 1349088 | | 10/2003 |
| EP | 1579331 | | 9/2005 |
| GB | 2256952 | | 12/1992 |
| GB | 2411030 | | 8/2005 |
| JP | 05189281 | | 7/1993 |
| JP | 06274605 | | 9/1994 |
| JP | 09016463 | | 1/1997 |
| JP | 11259348 | | 9/1999 |
| JP | 2000347811 | | 12/2000 |
| WO | WO-9303549 | | 2/1993 |
| WO | WO-9513580 | A1 | 5/1995 |
| WO | WO-9912098 | | 3/1999 |
| WO | WO-0104755 | A1 | 1/2001 |
| WO | WO-02-088943 | | 11/2002 |
| WO | WO-03028183 | | 4/2003 |
| WO | WO-03046768 | A1 | 6/2003 |
| WO | WO-2004034197 | | 4/2004 |

OTHER PUBLICATIONS

Fegreus, CommVault Simpana 8.0, Mar. 3, 2010, http://www.virtual-strategy.com/2010/03/03/commvault-simpana.*

Managing Data More Effectively in Virtualized Environments with CommVault® Simpana® Universal Virtual Software Agent, © 1999-2009.*

Harriman-Polanski, CommVault Galaxy Enhances Data Protection, Reprinted from Dell Power Solutions, May 2006.*

Australian Examiner's First Report on Patent Application No. 2009293328, Mail Date Dec. 21, 2011, 2 pages.

U.S. Appl. No. 13/250,763, filed Sep. 20, 2011, Prahlad.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

CommVault Systems, Inc., "CommVault Galaxy Express 7.0 Backup & Recovery," copyright date 1999-2007, 4 pages.

CommVault Systems, Inc., "CommVault QiNetix: Architecture Overview," CommVault Systems White Paper, 2005, 35 pages.

CommVault Systems, Inc., "CommVault Simpana Software with SnapBackup," copyright date 1999-2009, 6 pages.

Commvault, "Remote Backup," <http://documentation.commvault.com/commvault/release_8_0_0/books_online_1/english_us/features/ddr/ddr.htm>, internet accessed on Dec. 17, 2009, 8 pages.

CommVault, "Snap Backup," <http://documentation.commvault.com/commvault/release_8_0_0/books_online_1/english_us/features/snap_backup/snap_backup.htm>, internet accessed on Dec. 17, 2009, 7 pages.

CommVault, "Snapshots," <http://documentation.commvault.com/commvault/release_8_0_0/books_online_1/english_us/features/snapshots/snapshots.htm>, internet accessed on Dec. 15, 2009, 2 pages.

CommVault, "Volume Shadow Services (VSS)," <http://documentation.commvault.com/commvault/release_8_0_0/books_online_1/english_us//features/snapshots/vss/vss.htm>, internet accessed on Dec. 23, 2009, 1 page.

EMC Corporation, "EMC CLARiiON CX Series," May 2006, 7 pages.

EMC Corporation, "EMC CLARiiON CX3 UltraScale Series," Feb. 2008, 6 pages.

EMC Corporation, "EMC Symmetrix DMX Series," Jan. 2008, 8 pages.

Garimella, N., "Understanding and Exploiting Snapshot Technology for Data Protection, Part 1: Snapshot Technology Overview," <http://www.ibm.com/developerworks/tivoli/library/t-snaptsm1/index.html>internet accessed on Dec. 22, 2009, 8 pages.

Hitachi Data Systems, "Hitachi HiCommand Protection Manager Software," Feb. 2007, 2 pages.

International Search Report and Written Opinion for International Application No. PCT/US09/57102, Mail Date Nov. 6, 2009, 14 pages.

International Search Report and Written Opinion for International Application No. PCT/US10/62146, Mail Date Feb. 18, 2011, 9 pages.

International Search Report and Written Opinion for International Application No. PCT/US2004/038323, date of mailing Feb. 19, 2008, 10 pages.

International Search Report and Written Opinion for International Application No. PCT/US10/62158; Mail Date Feb. 23, 2011, 8 pages.

Marshall, David, "Veeam's SureBackup transforms VMware image backups," <http://www.infoworld.com/print/117315>, internet accessed on Mar. 23, 2010, 4 pages.

Microsoft TechNet, "How Volume Shadow Copy Service Works," <http://technet.microsoft.com/en-us/library/cc785914(WS.10,printer).aspx>, internet accessed on Dec. 17, 2009, 6 pages.

(56) References Cited

OTHER PUBLICATIONS

Microsoft TechNet, "Overview of Exchange Server Backup Methods," <http://technet.microsoft.com/en-us/library/aa996125(EXCHG.65,printer).aspx>, internet accessed on Dec. 29, 2009, 3 pages.

Microsoft TechNet, "What is Volume Shadow Copy Service?" Mar. 28, 2003, 5 pages.

Microsoft.com, "XADM: Hot Split Snapshot Backups of Exchange," <http://support.microsoft.com/kb/311898/>, internet accessed on Dec. 29, 2009, 5 pages.

MSDN, "Backup Sequence Diagram," <http://msdn.microsoft.com/en-us/library/ms986539(EXCHG.65,printer).aspx>, internet accessed on Dec. 30, 2009, 1 page.

MSDN, "Exchange Transaction Logs and Checkpoint Files," <http://msdn.microsoft.com/en-us/library/ms986143(EXCHG.65,printer).aspx>, internet accessed on Dec. 30, 2009, 1 page.

MSDN, "Identifying Required Transaction Logs," <http://msdn.microsoft.com/en-us/library/ms986606(EXCHG.65,printer).aspx>, internet accessed on Dec. 30, 2009, 1 page.

MSDN, "Overview of Processing a Backup Under VSS," <http://msdn.microsoft.com/en-us/library/aa384589(VS.85,printer).aspx>, internet accessed on Dec. 18, 2009, 3 pages.

MSExchange.org, "Exchange log disk is full, Prevention and Remedies," <http://www.msexchange.org/articles/exchange-log-disk-full.html?printversion>, internet accessed on Dec. 30, 2009, 7 pages.

NetApp, "NetApp SnapManager for Microsoft Exchange," 2009, 2 pages.

Network Appliance, Inc., "Network Appliance Snapshot Technology," copyright 2004, 1 page.

OpenAir.com, Product Update—Jun. 21, 2001, http://web.archive.org/web/20011007153900lhttp:llwww.openair.comlhomeln.s-ub.--p.sub.--update062101 .html, Oct. 2001, 3 pages.

Veeam Software, "The New Standard for Data Protection," internet accessed on Mar. 23, 2010, 2 pages.

Veritas Software Corporation, "Veritas Volume Manager 3.2, Administrator's Guide," Aug. 2001, 360 pages.

Wikipedia.org, "Snapshot (computer storage)," <http://en.wikipedia.org/w/index.php?title=Snapshot_(computer_storage)>, internet accessed on Dec. 15, 2009, 3 pages.

U.S. Appl. No. 13/619,206, filed Sep. 14, 2012, Prahlad et al.

FalconStor Software, "Impact-free Backup of Vmware Environments", http://www.falconstor.com/dmdocuments/HyperTrac_for_VMware_SB_HR.pdf>, 2011, 2 pages.

CommVault Partner Advantage, "CommVault First to Market with Complete 'Zero Impact' Backup Soltuions for Mixed Windows and UNIX Environments", <http://partners.commvault.com/microsoft/microsoft_news_story.asp?id=164>, Sep. 25, 2002, 2 pages.

Robinson, Simon, "CommVault Unveils QiNetix to Unite Data Movement with Storage Management", 451 Research, Oct. 11, 2002, 3 pages.

CNET Reviews, "IPStor Enterprise Edition ZeroImpact Backup Enabler Option—(V.4.0) Manufacturer Description", May 8, 2004, 1 page.

FalconStor Software, "Zero-impact Unified Backup & DR", <http://www.falconstor.com/solutions/solutions-for-server-virtualization/vmware-solutions/zero-impact-unified-backup-a-dr>, undated, internet accessed May 2, 2012, 1 page.

FalconStor Software, "Unified Backup & DR for Vmware Environments", http://www.falconstor.com/dmdocuments/UniBU-DR_CDP_SB_100520.pdf>, 2001, 2 pages.

U.S. Appl. No. 13/792,104, filed Mar. 10, 2013, Varadharajan et al.

* cited by examiner

UTILIZING SNAPSHOTS TO PROVIDE BUILDS TO DEVELOPER COMPUTING DEVICES

CROSS-REFERENCE TO RELATED APPLICATIONS

This application is related to U.S. patent application Ser. No. 12/553,294, filed on Sep. 3, 2009, entitled SYSTEMS AND METHODS FOR MANAGEMENT OF VIRTUALIZATION DATA, which is incorporated by reference in its entirety.

BACKGROUND

The development of software is generally done as a series of software builds, also known as development builds, dev builds, or just builds. A build may refer to a process of converting source code files into standalone software artifacts capable of being run by a computer, or the result of such a process. Thus, during the creation of software, developers may create many different builds, such as weekly or even daily builds, before reaching a final product.

As can be appreciated, a single computing machine is often unable to manage and store many builds during the development of software, and arrays and other external storage devices may be utilized. However, although the arrays may provide enough storage for a development environment, conventional systems require the copying and moving around of build data to developers requesting the data. Such moving and copying, often manual processes, may not be feasible for many software development environments, such as software development environments that include many software developers creating and modifying many builds over a network.

There is a need for a system that overcomes the above problems, as well as providing additional benefits.

DETAILED DESCRIPTION

Overview

A method and system for utilizing snapshots to provide software builds to developer computing devices is described. In some examples, the system, in response to receiving a request for a software build, performs a snapshot of a storage volume containing the requested build, and mounts the snapshot to the developer computing device, enabling the developer computing device to access the software build.

In some examples, the system, in response to receiving a request for a software build, establishes a virtual machine, performs a snapshot of a storage volume containing the requested build, mounts the snapshot to the established virtual machine, and provides the virtual machine to the requesting computing device.

Thus, the system, in some examples, enables software developers in a software build environment to access builds stored within the environment without requiring the build environment to copy and/or transfer the build to computing devices associated with the software developers, among other benefits. Furthermore, the system, in some examples, provides software developers with virtual build environments, including any requested builds and/or computing resources associated with the build, in order to provide the developers with the build data and resources needed to perform certain tasks during the development of software. Such a system may facilitate a faster, more accurate, development of software, among other things.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
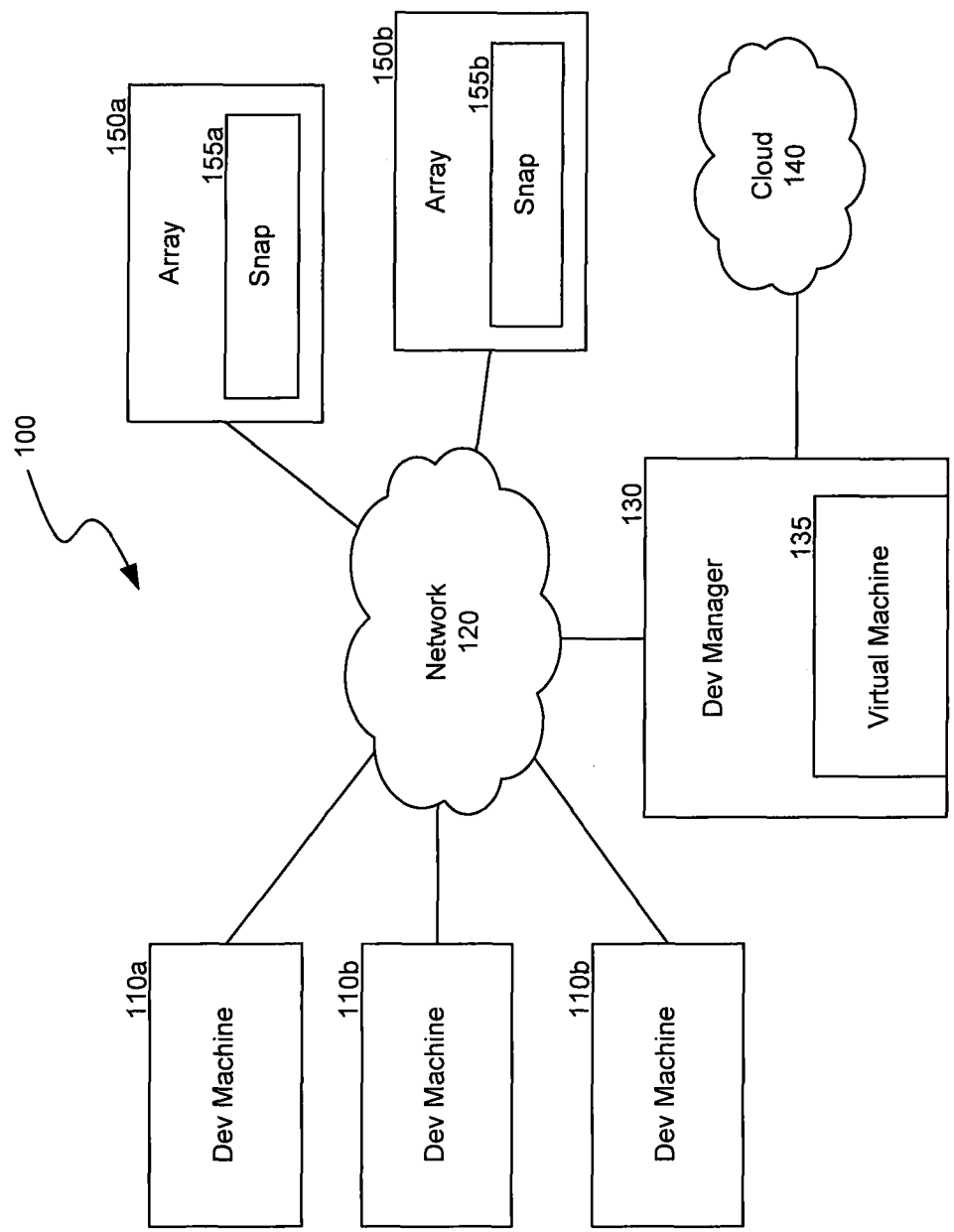
FIG. 1 is a block diagram illustrating a computing environment in which aspects of the system may be implemented.
Figure 2:
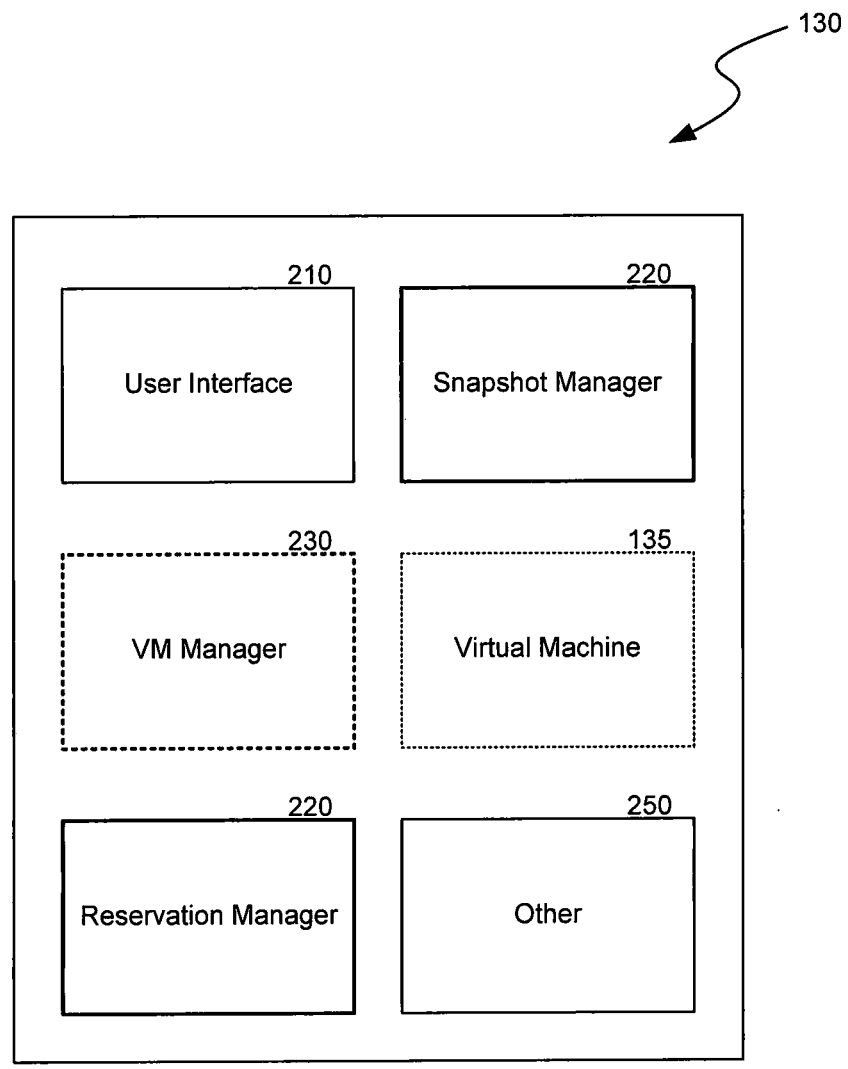
FIG. 2 is a block diagram illustrating components of a management component associated a software build environment.

FIGS. 1 and 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

FIG. 1 is a block diagram illustrating a computing environment 100 in which aspects of the system may be implemented. The computing environment 100 includes one or more development machines 110a, 110b, 110c, associated with software developers, that create build data to be stored in arrays 150a, 150b in communication with the development machines 110a-c over a network 120. The arrays 150a, 150b may be any number of different storage arrays. Examples include IBM XIV arrays, HP StorageWorks, EMC Symmetrix, and so on. The arrays 150a-b may include various components utilized during storage and restoration of data within the arrays, such as snapshot components 155a, 155b. The snapshot components 155a-b may perform snapshots on data stored within the array volumes 150a-b, such as build data.

In some cases, a snapshot refers to the state of a system as a specific point in time. For example, a snapshot component may create a read-only copy of a data set within a volume at a point in time, allowing applications to continue writing data to the volume. Generally, snapshot components are efficient and do not unduly tax a volume. In some examples, once the initial snapshot is taken of a volume, subsequent incremental snapshots copy changed data only, and use a system of pointers to reference the initial snapshot. Such a technique may consume less disk capacity versus continually taking a snapshot of an entire volume. Read-write snapshots are sometimes called branching snapshots, because they implicitly create diverging versions of their data. In addition to backups and data recovery, read-write snapshots may be used in virtualization, sandboxing, virtual hosting, and other regimes, because of their usefulness in managing changes to large sets of files, among other things.

The arrays 150a-b may include hardware snapshot components associated with the type of array. For example, an IBM XIV array includes a snapshot component configured to take snapshots of data sets stored in the array volume. The computing environment 100 may include other snapshot components not array specific, such as software-based snapshot components used in data storage systems, such as the CommVault Simpana system, available from CommVault Systems, Inc.

The computing environment 130 also includes a development manager 130, which may include a virtual layer capable of establishing a virtual machine environment 135 accessible by one or more of the development machines 110a-c. The development manager 130 may provide various management functions associated with the development of software within the computing environment 100, including storage functions, indexing functions, control functions, coordination functions, build management, and so on. The development manager 130 may provide some or all resources and data by utilizing a cloud-based computing system 140, or other computing resources (not shown). For example, the development manager 130 may establish a virtual machine 135 to be accessed by the development machines 110a-c within the cloud-based computing system 140.

The development manager 130 may function, in part, as a build tool for software development within computing environment 100. The process of building computer software is usually managed by a build tool, which is a program that coordinates and controls other programs. Examples of such a program include make, ant, maven, SCons, Phing, and so on, The build tool, which may also be stored on development machines 110a-c, often compile and/or link various files, in the correct order. For example, if the source code in a particular file has not changed, then it may not need to be recompiled. Further details regarding the development manager 130 will now be discussed with respect to FIG. 2.

FIG. 2 is a block diagram illustrating components of a development manager 135 associated with a software build environment. The development manager 135 includes a user interface component 210, a snapshot management component 220, an optional virtual machine component 230, a reservation management component 240, and other components 250.

In some examples, the user interface component 210 provides an interface to the development machines 110a-c that presents developers with builds available to be accessed. For examples, the user interface component 210 may present a list of builds available to a developer at his/her development machine 110a, and receive input indicating a selection of a desired build.

In some examples, the snapshot management component 220 facilitates the performance of snapshot on volumes that store build data. For example, the snapshot management component 220, in response to the system receiving a request for access to a certain build, may cause a snapshot component 155a at an external array 150a storing the requested build to take a snapshot of the volume storing the requested build. The snapshot management component 220 may also cause or facilitate the mounting of the taken snapshot to the requesting development machine 110a or to a virtual machine 135 which may be establishes by the virtual machine component 230.

In some examples, the reservation management component 240 monitors and/or managers the provision of snapshot-based access of development machines 110a-c to builds stored in arrays 150a-c. For example, the reservation management component 240 may reserve a certain number of development machines for a certain build, may delete snapshots once a development machine is finished with a provided build, and/or may perform other functions described herein.

Figure 3:
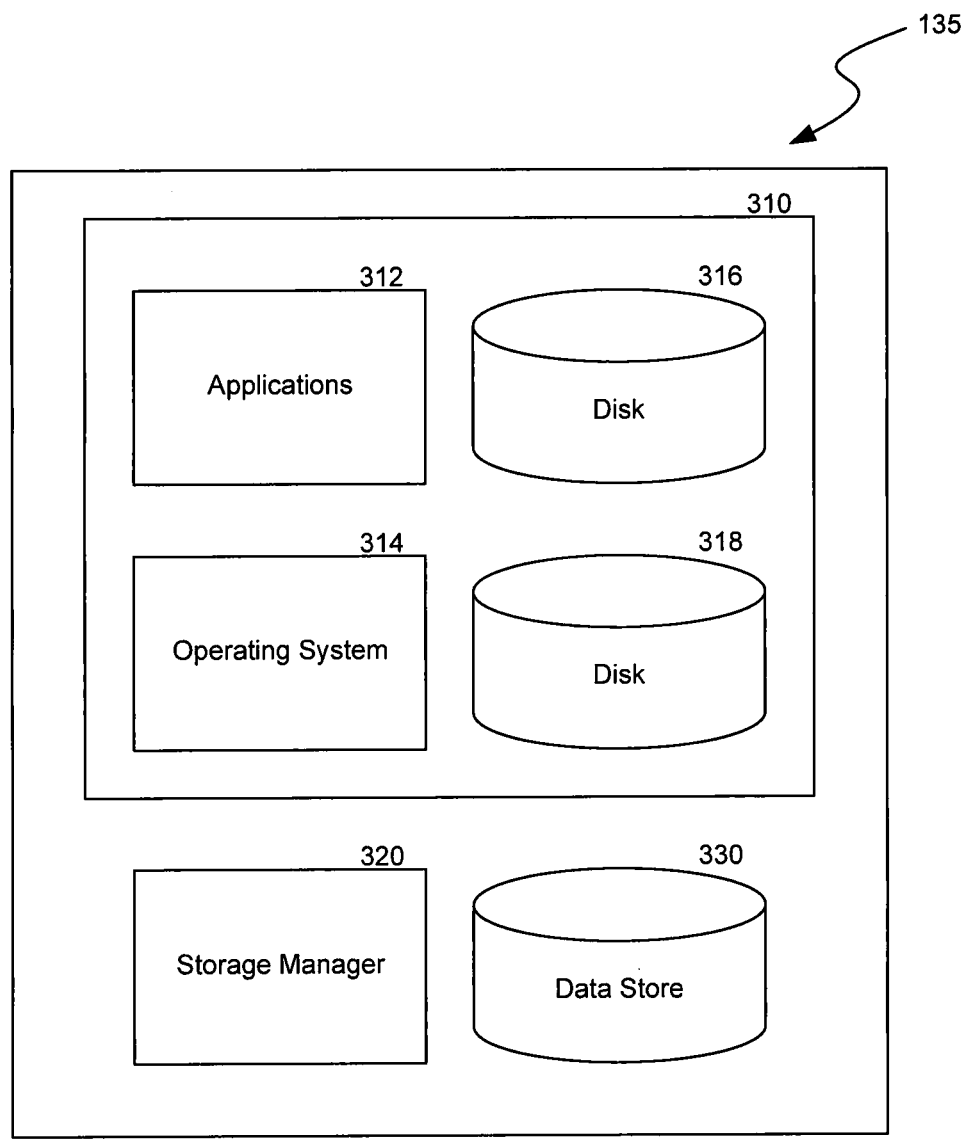
FIG. 3 is a block diagram illustrating a virtualization layer in which aspects of the system may be implemented.

For example, in collaboration with the virtual machine component 230, the reservation management component 240 may cause a virtual machine to be established and provided to a development machine 110a in response to a request from the development machine 110a for a certain build. FIG. 3 is a block diagram illustrating a virtualization layer 135 in which aspects of the system may be implemented.

In general, virtualization refers to the simultaneous hosting of one or more operating systems on a physical computer. Such virtual operating systems and their associated virtual resources are called virtual machines. Virtualization software sits between the virtual machines and the hardware of the physical computer. One example of virtualization software is ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Sun Microsystems Inc. of Santa Clara, Calif. Virtualization software provides to each virtual operating system virtual resources, such as a virtual processor, virtual memory, a virtual network device, and a virtual disk. Each virtual machine has one or more virtual disks. Virtualization software typically stores the data of virtual disks in files on the file system of the physical computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Referring to FIG. 3, the virtual layer 135 may operate on on or be hosted by a computing device, such as the development manager 130. The virtual layer 135 may also include or be connected to a virtual data store, such as primary data store disk 316 or secondary data store disk 318, connected to the virtual layer via a storage area network. The virtual layer 135 also includes a virtual machine storage manager 320 operating on or being hosted by another computing device, which may be another server, and a secondary storage data store 330 connected to the computing device. The computing devices may be connected to each other via a network, which may be a LAN, a WAN, the public Internet, some other type of network, and so on.

The virtual layer hosts one or more virtual machines 310. The virtual machine 310 includes an operating system 314 and one or more applications 312 executing on the operating system or loaded on the operating system. The operating system 314 may be any type of operating system, such as Microsoft Windows 95/98/NT/2000/XP/2003/2008/2010, Linux operating systems, Sun Solaris operating systems, UNIX operating systems, Apple OSx, and so on, that can be hosted by the virtual layer 315. The applications 312 may be any applications (e.g., database applications, file server applications mail server applications, web server applications, transaction processing applications, snapshot applications, media streaming applications, build applications, and so on) that may run on the operating system 314. The virtual machine may also be connected to the various networks described herein.

The operating system 312 may be connected to the virtual storage disks 316, 318 via the SAN, which may be any type of SAN, such as a Fibre Channel SAN, an iSCSI SAN, or any other type of SAN. A primary storage data store may store the virtual disks 316, 318 of the virtual machine 310 hosted by the virtual layer 135. A virtual disk 316, 318 may correspond to one or more files (e.g., one or more*.vmdk or*.vhd files) on the primary storage data store. The primary storage data store may store a primary copy of the data of the virtual machine 310. Additionally or alternatively, the virtual disks 316, 318 may be stored by other storage devices in a data storage system, such as in the cloud-based computing system 140.

A primary copy of data generally includes a production copy or other "live" version of the data that is used by a software application and is generally in the native format of that application. Primary copy data may be maintained in a local memory or other high-speed storage device (e.g., on the virtual disks 316, 318 located in the primary storage data store) that allows for relatively fast data access, if necessary. Such primary copy data may be intended for short-term retention (e.g., several hours or days) before some or all of the data is stored as one or more secondary copies, for example, to prevent loss of data in the event a problem occurs with the data stored in primary storage.

In contrast, secondary copies include point-in-time data and are typically intended for long-term retention (e.g., weeks, months, or years depending on retention criteria, for example, as specified in a storage or retention policy) before some or all of the data is moved to other storage or discarded. Secondary copies may be indexed so users can browse and restore the data at another point in time. After certain primary copy data is backed up, a pointer or other location indicia, such as a stub, may be placed in the primary copy to indicate the current location of that data.

The virtual machine storage manager 320 includes a virtual machine storage operation component, which includes a Virtual Logical Unit Number (VLUN) driver for accessing virtual disks 316, 318, and a virtual machine mount component for mounting virtual machines. The virtual machine storage manager 320 also includes a data agent. The data agent includes an integration component that provides functionality for the virtual machine storage operation component. The data agent also includes a virtual disk analyzer component that examines the virtual disk and configuration files corresponding to the virtual disks 316, 318 and extracts metadata from the virtual disk and configuration files. For example, the integration component may include a set of scripts that the data agent causes to be run prior to, during, and/or following a copy of virtual machine data. As another example, the integration component may be a component that encapsulates or wraps the virtual machine mount component and provides an Application Programming Interface (API) with functions for accessing the virtual machine mount component. The virtual machine storage manager 320 also includes a data store 330 that maintains data used by the virtual machine storage manager 320, such as data used during storage operations, and configuration data.

Virtual disks 316, 318 may have various configurations. As previously described, a virtual disk 316, 318 corresponds to one or more virtual disk files (e.g., one or more*.vmdk or *.vhd files) on a primary storage data store. A virtual layer 135 may support several types of virtual disks 316, 318. For example, a virtual disk may be either: 1) a growable virtual disk contained in a single virtual disk file that can grow in size (e.g., a monolithic sparse virtual disk that starts at 2 GB and grows larger); 2) a growable virtual disk split into multiple virtual disk files (e.g., a split sparse virtual disk comprising multiple 2 GB virtual disk files), the aggregation of which can grow in size by adding new virtual disk files; 3) a preallocated virtual disk contained in a single virtual disk file (e.g., a monolithic flat virtual disk, the size of which does not change); or 4) a preallocated virtual disk split into multiple virtual disk files (e.g., a split flat virtual disk comprising multiple 2 GB virtual disk files, the number of which and the size of each of which does not change). Where a virtual disk is split into multiple virtual disk files, each individual virtual disk file is called an extent. A virtual layer 135 may also support types of virtual disks other than these types. Those of ordinary skill in the art will understand that a virtual disk can be structured in a wide variety of configurations, and that virtual disks are not limited to the configurations described herein.

A virtual layer 135 may support snapshotting, or taking a snapshot of a virtual machine. The virtual layer 135 can snapshot a virtual machine in a linear fashion (in which there is only one branch of snapshots from the original state of the virtual machine, and each snapshot in the branch linearly progresses from prior snapshots) or in a process tree (in which there are multiple branches of snapshots from the original state of the virtual machine, and two snapshots may or may not be in the same branch from the original state of the virtual machine). When a snapshot is taken of a virtual machine, the virtual machine stops writing to its virtual disks (e.g., stops writing to the one or more *.vmdk files). The virtual machine writes future writes to a delta disk file (e.g., a *delta.vmdk file) using, for example, a copy-on-write (COW) semantic. As the virtual machine layer 135 can snapshot a virtual machine repeatedly, there can be multiple delta disk files. The virtual disk and delta disk files can be analogized to links in a chain. Using this analogy, the original disk file is a first link in the chain. A first child delta disk file is a second link in the chain, and a second child delta disk file is a third link in the chain, and so forth.

Also as previously described, a virtual machine generally has associated configuration files that a virtual layer 135 uses to store configuration data about the virtual machine. These configuration files may include a *.vmx file, which stores data about the parent-child relationships created between virtual disk files and delta disk files when a snapshot of a virtual machine is taken. These configuration files may also include a disk descriptor file (e.g., a *.vmdk file). In some examples, instead of using a disk descriptor file, the disk descriptor is embedded into a virtual disk file (e.g., embedded in a *.vmdk file).

The disk descriptor file generally stores data about the virtual disk files that make up a virtual disk 316, 318. This data includes information about the type of the virtual disk. For example, the virtual disk may be a monolithic flat virtual disk, a monolithic sparse virtual disk, a split flat virtual disk, a split sparse virtual disk or another type of a virtual disk. This data also includes an identifier of the parent of the virtual disk file, if it has one (if the virtual machine has been snapshotted, its original virtual disk file will have a child virtual disk file), a disk database describing geometry values for the virtual disk (e.g., cylinders, heads and sectors) and information describing the extents that make up the virtual disk. Each extent may be described by a line in the disk descriptor file having the following format: [type of access] [size] [type] [file name of extent]. Following is an example of a line in the disk descriptor file describing an extent: [0053]RW 16777216 VMFS "test-flat.vmdk." This line describes an extent for which read/write access is allowed, of size 16777216 sectors, of type VMFS (e.g., for use on a primary storage data store), and the filename of the virtual disk file— "test-flat.vmdk."

A virtual layer 135 provides an abstraction layer such that the one or more virtual disks files (and any delta disk files) of the virtual disks 316, 318 appear as one or more actual disks (e.g., one or more hard disk drives) to a virtual machine. Because the virtual layer 135 abstracts the virtual disk so that it appears as an actual disk to an operating system 314 executing on the virtual machine 310, the operating system 314 can generally use its standard file system for storing data on a virtual disk 316, 318. The various structures used by the file system and the operating system 314 (e.g., the partition table (s), the volume manager database(s) and the file allocation table(s)) are stored in the one or more virtual disk files that make up a virtual disk.

For example, a virtual layer 135 may store a single virtual disk file (e.g., a single *.vmdk file) that is a preallocated virtual disk (a monolithic flat virtual disk) for each virtual disk used by a virtual machine operating on the virtual layer 135. The single virtual disk file may be named <virtual machine name>-flat.vmdk. There would also be a disk descriptor file for the single virtual disk file that would typically be named <virtual machine name>-.vmdk. A snapshot taken of the virtual machine would result in an additional delta disk file being created that is a single virtual disk file (e.g., a single *.vmdk file), which is a growable virtual disk (a monolithic sparse virtual disk). The delta disk file would typically be named <virtual disk name>-<######>-delta.vmdk, where <######> is a number indicating the sequence of the snapshot. There would also be a disk descriptor file for the single virtual disk file that would typically be named <virtual disk name>-<######>-.vmdk, again, where <######> is a number indicating the sequence of the snapshot.

Further details regarding the establishment of a virtual machine may be found in commonly-assigned U.S. patent application Ser. No. 12/553,294, filed on Sep. 3, 2009, entitled SYSTEMS AND METHODS FOR MANAGEMENT OF VIRTUALIZATION DATA, which is incorporated by reference in its entirety.

Figure 4:
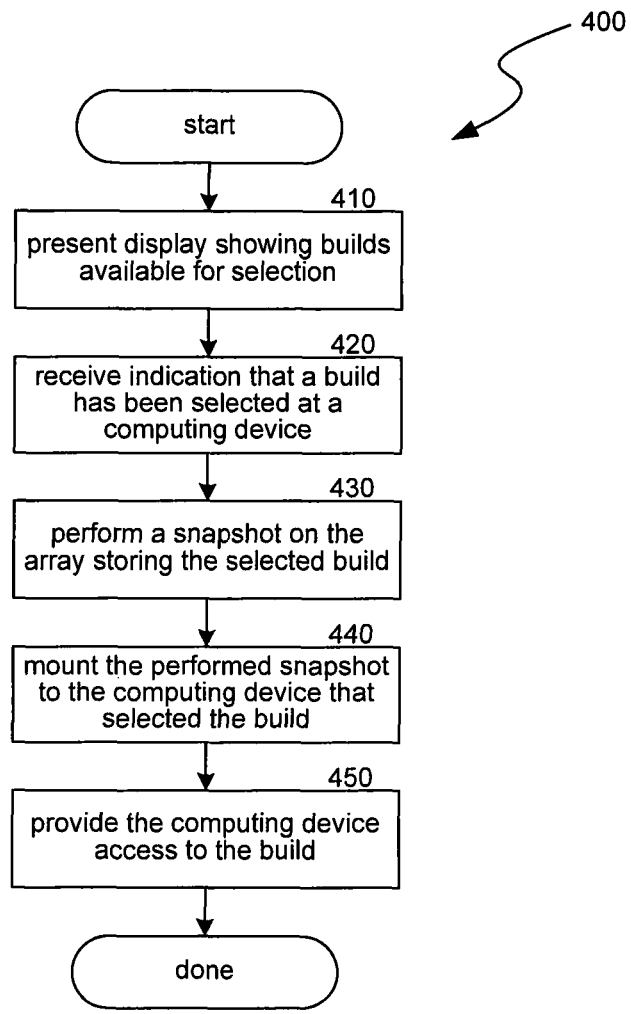
FIG. 4 is a flow diagram illustrating a routine for providing a development build to a computing device.

Thus, the system may include devices and/or components configured and/or programmed to perform snapshots on build data stored in array volumes. Further, the system may include devices and/or components configure and/or programmed to mount the snapshots to requesting development machines, mount the snapshots to established virtual computing provided to requesting development machines, or perform other functions that facilitate access to build data via the snapshots.
Utilizing Snapshots to Provide Builds to Computing Devices As discussed herein, the system enables development machines to access software builds by utilizing snapshot mechanisms to provide copies of the software builds. FIG. 4 is a flow diagram illustrating a routine 400 for providing a development build to a computing device.

In step 410, the system presents a display showing available builds within a software development environment. For example, a user interface component 210 may present a user interface that presents a list of builds/data volumes associated with software development to a development machine 110*a*. The user interface may be a webpage or other page provided within a network that enables developers to review and access various different builds during the development of software.

In step 420, the system receives an indication that a build has been selected at a computing device. For example, the user interface component 210 presented at a development machine 110*a* receives an indication that a developer wishes to access a certain build during the development of software, such as a selection of a build/volume presented within the user interface.

In step 430, the system performs a snapshot on an external array having a volume storing the selected build. For example, a snapshot management component 220, in communication with the user interface component 210, causes a snapshot mechanism at the external array to perform a snapshot of a volume containing the selected build. In some cases, the system may automatically perform the snapshot in response to the selection. In some cases, the system may only perform the snapshot once a build is requested.

In step 440, the system mounts the snapshot to the requesting computing device. For example, the snapshot management component 220 may cause the snapshot to be mounted to the development machine 110*a*. In step 450, the system provides access to the requested build. For example, the system may provide a drive or other transparent access to a requested build mounted to a development machine.

During access, a developer, via his/her mounted development machine, may make changes to the build, such as modifications, corrections, and so on. Once access is complete and the development machine no longer needs access to the build, the system may delete the snapshot, take a snapshot of the snapshot, automatically take another snapshot when changes are made to the build, and so on. That is, the system, in response to changes made to a build, may take a snapshot of the build before checking the build back into the development environment. The system may then delete the original snapshot.

Figure 5:
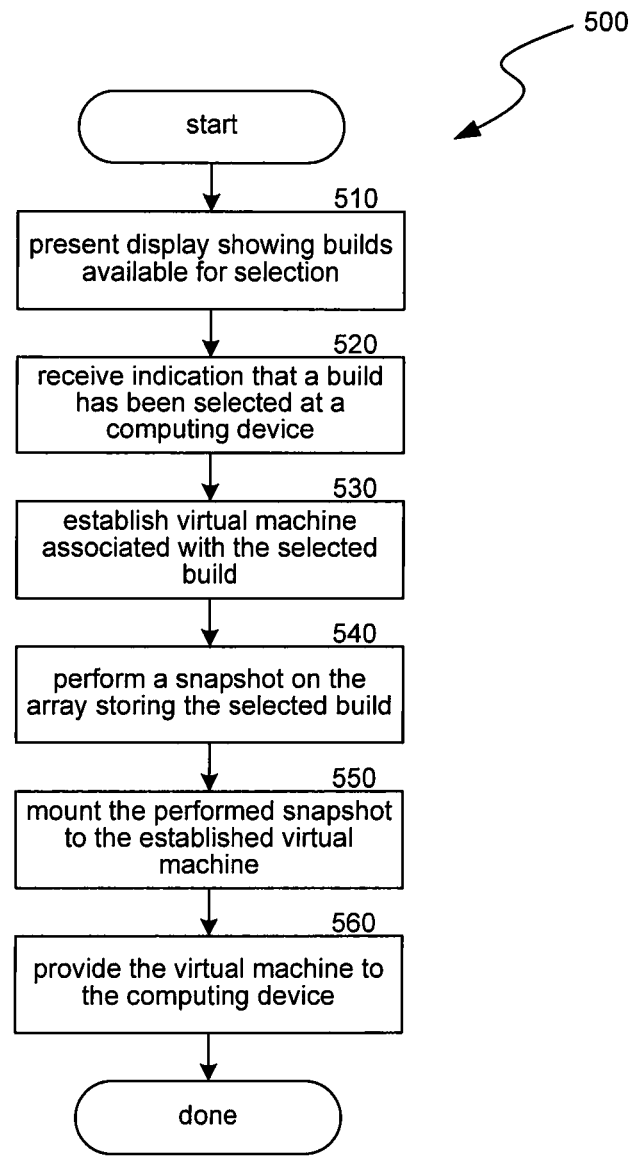
FIG. 5 is a flow diagram illustrating a routine for providing a virtual machine associated with a development build to a computing device.

Thus, in some examples, the system provides an automatic way to mount any software build stored in any external storage device to any development machine creating data for the software build. That is, the system enables a developer to view available builds, select a build, access the build, and utilize the build, without copying and transferring the data of the build across the development environment, among other benefits. In addition, the system, in some examples, may also provide a complete build environment to developers, when needed. For example, a certain development machine associated with a developer may not have the tools/resources to compile or otherwise work with a build provided to the developer. In such examples, the system may enable the developer to receive the necessary resources along with a desired build. FIG. 5 is a flow diagram illustrating a routine 500 for providing a virtual machine associated with a development build to a computing device.

In step 510, the system presents a display showing available builds within a software development environment. For example, a user interface component 210 may present a user interface that presents a list of builds/data volumes associated with software development to a development machine 110a. The user interface may be a webpage or other page provided within a network that enables developers to review and access various different builds during the development of software.

In step 520, the system receives an indication that a build has been selected at a computing device. For example, the user interface component 210 presented at a development machine 110a receives an indication that a developer wishes to access a certain build during the development of software, such as a selection of a build/volume presented within the user interface.

In step 530, the system establishes a virtual machine associated with the selected build. For example, the system may determine that a development machine requesting a selected build does not include resources necessary to compile the build. The system may, therefore, establish a virtual machine that includes preinstalled software and other resources associated with the build. That is, the system may create a new, virtual build machine that contains all the tools and resources to manipulate the data within the selected build.

In step 540, the system performs a snapshot on an external array having a volume storing the selected build. For example, a snapshot management component 220, in communication with the user interface component 210, causes a snapshot mechanism at the external array to perform a snapshot of a volume containing the selected build. In some cases, the system may automatically perform the snapshot in response to the selection. In some cases, the system may only perform the snapshot once a build is requested.

In step 550, the system mounts the snapshot to the established virtual machine. For example, the snapshot management component 220 may cause the snapshot to be mounted to a virtual machine 135 established by the virtual machine component 230.

In step 560, the system provides the virtual machine to the computing device. For example, the virtual machine component 230 provides a virtual machine and all the necessary build data to a development machine 110a.

Thus, the system may, in response to a request for build data, establish a virtual machine, mount a snapshot of a volume containing build data to the establishes virtual machine, and provide the virtual machine to a software developer.

In addition to development environments, the system may be utilized by other computing environments. For example, the system may utilize access to data using snapshot in document storage environments, multimedia libraries, document management systems (e.g., SharePoint), and other environments in which data may be staged and/or accessed by users without affecting other users.

In some examples, the system may perform various load balancing on arrays and other external storage devices that take snapshots of data and provide the data to users within a network. For example, the system may balance the load across various connectors in an array when multiple snapshots are being performed at the array. Additionally, the system may employ a reservation policy that limits the time of access of a build for a developer. That is, the system may automatically delete snapshots after a certain time period of inactivity associated with a developer's access of a requested build. Thus, such load balancing techniques may facilitate the system to provide access to builds within a development environment without bottlenecks on storage devices, among other benefits.

Therefore, the system, in some examples, enables developers to access builds (and associated computing resources) in a software development environment by utilizing the snapshot capabilities of external arrays and other data storage components. The snapshot mechanisms facilitate quick and easy access to data associated with builds, providing developers with access to an entire development environment at their development machine. Further, the system may establish virtual development machines to developers, providing developers with a wide variety of resources and data within a development environment.

CONCLUSION

From the foregoing, it will be appreciated that specific embodiments of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A method for providing a build to a computing device associated with a developer, the method comprising:
   providing a user interface presenting for selection a list of accessible builds associated with software under development;
   receiving via the provided user interface a request from a computing device to access a selected build within the list of builds associated with the software under development;
   determining that the computing device providing the request does not include software resources necessary to compile the requested build;
   if the computing device does not include the software resources, establishing a virtual machine that includes the software resources associated with the requested build;
   performing a snapshot of a storage volume containing the requested build;
   mounting the snapshot to the established virtual machine;
   providing the established virtual machine to the computing device requesting access to the requested build to provide the computing device with access to the requested build via the mounted snapshot.

2. The method of claim 1, wherein the storage volume containing the requested build is contained by a storage array in communication with the computing device over a network; and wherein a hardware snapshot mechanism associated with the storage array performs the snapshot of the volume containing the requested build.

3. The method of claim 1, wherein the storage volume containing the requested build is contained by a storage array in communication with the computing device over a network; and wherein a software snapshot mechanism associated with a data storage system that stores data to the storage array performs the snapshot of the volume containing the requested build.

4. The method of claim 1, further comprising:
   deleting the performed snapshot after the snapshot is dismounted from the computing device.

5. The method of claim 1, further comprising: identifying one or more changes made to the requested build; and updating the requested build; and deleting the performed snapshot after the snapshot is dismounted from the computing device.

6. The method of claim 1, further comprising: identifying one or more changes made to the requested build; and performing a snapshot of the snapshot of the volume containing the requested build; and deleting the snapshot of the snapshot of the volume containing the requested build after the snapshot is dismounted from the computing device.

7. A system for providing access to a build within a development environment, the system comprising:
   a memory having instructions; and
   a processor coupled to the memory and configured to execute:
      a request component configured to receive a request from a computing device to access the build within the development environment, wherein the request component is configured to provide a user interface to the computing device within the development environment that lists builds available to be accessed by the computing device and receives a selection of an available build to be accessed by the computing device;
      a snapshot component, wherein the snapshot component is configured to perform a snapshot of a storage volume of data containing the build; and
      a virtualization component, wherein the virtualization component is configured to establish a virtual machine and mount the performed snapshot to the virtual machine and provide the virtual machine to the computing device to provide the computing device, via the virtual machine and the mounted snapshot, with access to the build and with access to software resources used to manipulate the build when the computing device does not already include the software resources needed to manipulate the build.

8. The system of claim 7, wherein the volume of data is an external storage array and the snapshot component is configured to cause a snapshot mechanism associated with the external storage array to perform the snapshot of the volume of data containing the build.

9. The system of claim 7, wherein the virtualization component is configured to utilize cloud-based computing resources in order to establish the virtual machine that mounts the performed snapshot and provides the computing device within the development environment access to the build and access to resources used to manipulate the build.

10. The system of claim 7, wherein the established virtual machine includes software capable of compiling the requested build.

11. A non-transitory computer-readable medium whose contents, when executed by a computing device, cause the computing device to perform a method of providing a build to a development machine, the method comprising:

providing a user interface presenting for selection a list of accessible builds associated with software under development;

receiving via the provided user interface a request from a computing device to access a selected build within the list of builds associated with the software under development;

determining that the computing device providing the request does not include the software and resources necessary to compile the requested build;

if the computing device does not include the software and resources, establishing a virtual machine that includes the software and the resources associated with the requested build;

performing a snapshot of a storage volume containing the requested build;

mounting the snapshot to the established virtual machine;

providing the established virtual machine to the computing device requesting access to the build to provide the computing device with access to the build via the mounted snapshot.

12. The computer-readable medium of claim 11, wherein the volume containing the requested build is contained by a storage array in communication with the development machine over a network; and wherein a hardware snapshot mechanism associated with the storage array performs the snapshot of the volume containing the requested build.

13. The computer-readable medium of claim 11, wherein the volume containing the requested build is contained by a storage array in communication with the computing device over a network; and wherein a software snapshot mechanism associated with a data storage system that stores data to the storage array performs the snapshot of the volume containing the requested build.

14. The computer-readable medium of claim 11, further comprising:

deleting the performed snapshot after the snapshot is dismounted from the development machine.

15. The computer-readable medium of claim 11, further comprising:

identifying one or more changes made to the requested build; and updating the requested build; and deleting the performed snapshot after the snapshot is dismounted from the development machine.

16. The computer-readable medium of claim 11, further comprising: identifying one or more changes made to the requested build; and performing a snapshot of the snapshot of the volume containing the requested build; and deleting the snapshot of the snapshot of the volume containing the requested build after the snapshot is dismounted from the development machine.

* * * * *